(12) United States Patent  
Mimeault

(10) Patent No.: US 8,723,689 B2  
(45) Date of Patent: May 13, 2014

(54) PARKING MANAGEMENT SYSTEM AND METHOD USING LIGHTING SYSTEM

(75) Inventor: Yvan Mimeault, Québec (CA)

(73) Assignee: Leddartech Inc., Québec, Quebec (CA)

( * ) Notice: Subject to any disclaimer, the term of this patent is extended or adjusted under 35 U.S.C. 154(b) by 725 days.

(21) Appl. No.: 12/809,228

(22) PCT Filed: Dec. 19, 2008

(86) PCT No.: PCT/CA2008/002248
§ 371 (c)(1),
(2), (4) Date: Jun. 18, 2010

(87) PCT Pub. No.: WO2009/079779
PCT Pub. Date: Jul. 2, 2009

(65) Prior Publication Data
US 2010/0309024 A1     Dec. 9, 2010

Related U.S. Application Data

(60) Provisional application No. 61/015,738, filed on Dec. 21, 2007, provisional application No. 61/015,867, filed on Dec. 21, 2007.

(51) Int. Cl.
*B60Q 1/48* (2006.01)
*G08G 1/01* (2006.01)
*G08G 1/017* (2006.01)
*G01B 11/00* (2006.01)

(52) U.S. Cl.
USPC ......... 340/932.2; 340/933; 340/937; 356/394

(58) Field of Classification Search
USPC .................................................. 340/932.2
See application file for complete search history.

(56) References Cited

U.S. PATENT DOCUMENTS

| | | |
|---|---|---|
| 3,680,085 A | 7/1972 | Del Signore |
| 4,717,862 A | 1/1988 | Anderson |
| 4,808,997 A * | 2/1989 | Barkley et al. ............... 340/942 |
| 4,891,624 A | 1/1990 | Ishikawa et al. |
| 4,928,232 A | 5/1990 | Gentile |
| 5,102,218 A | 4/1992 | Min et al. |
| 5,134,393 A | 7/1992 | Henson |
| 5,179,286 A | 1/1993 | Akasu |
| 5,317,311 A | 5/1994 | Martell et al. |
| 5,357,331 A | 10/1994 | Flockencier |
| 5,381,155 A | 1/1995 | Gerber |
| 5,389,921 A | 2/1995 | Whitton |
| 5,621,518 A | 4/1997 | Beller |
| 5,633,629 A | 5/1997 | Hochstein |
| 5,633,801 A | 5/1997 | Bottman |
| 5,714,754 A | 2/1998 | Nicholas |
| 5,760,686 A | 6/1998 | Toman |
| 5,760,887 A | 6/1998 | Fink et al. |
| 5,764,163 A | 6/1998 | Waldman et al. |
| 5,777,564 A | 7/1998 | Jones |
| 5,805,468 A | 9/1998 | Blöhbaum |
| 5,812,249 A | 9/1998 | Johnson et al. |
| 5,828,320 A | 10/1998 | Buck |
| 5,838,116 A | 11/1998 | Katyl et al. |
| 5,889,477 A | 3/1999 | Fasterath |
| 5,896,190 A * | 4/1999 | Wangler et al. ............. 356/4.01 |
| 5,942,753 A | 8/1999 | Dell |
| 5,995,900 A | 11/1999 | Hsiao et al. |
| 6,044,336 A | 3/2000 | Marmarelis et al. |
| 6,094,159 A | 7/2000 | Osterfeld et al. |
| 6,100,539 A | 8/2000 | Blümcke et al. |
| 6,104,314 A | 8/2000 | Jiang |
| 6,107,942 A | 8/2000 | Yoo et al. |
| 6,115,113 A | 9/2000 | Flockencier |
| 6,142,702 A | 11/2000 | Simmons |
| 6,147,624 A | 11/2000 | Clapper |
| 6,166,645 A | 12/2000 | Blaney |
| 6,259,515 B1 | 7/2001 | Benz et al. |
| 6,259,862 B1 | 7/2001 | Marino et al. |
| 6,266,609 B1 | 7/2001 | Fastenrath |
| 6,285,297 B1 | 9/2001 | Ball |
| 6,340,935 B1 | 1/2002 | Hall |
| 6,377,167 B1 | 4/2002 | Juds et al. |
| 6,404,506 B1 | 6/2002 | Cheng et al. |
| 6,411,221 B2 | 6/2002 | Horber |
| 6,417,783 B1 | 7/2002 | Gabler et al. |
| 6,426,708 B1 | 7/2002 | Trajkovic et al. |
| 6,502,011 B2 | 12/2002 | Haag |
| 6,502,053 B1 | 12/2002 | Hardin et al. |

| | | |
|---|---|---|
| 6,516,286 B1 | 2/2003 | Aebischer et al. |
| 6,548,967 B1 | 4/2003 | Dowling et al. |
| 6,556,916 B2 | 4/2003 | Waite et al. |
| 6,559,776 B2 | 5/2003 | Katz |
| 6,642,854 B2 | 11/2003 | McMaster |
| 6,650,250 B2 | 11/2003 | Muraki |
| 6,665,621 B2 | 12/2003 | Drinkard et al. |
| 6,753,766 B2 | 6/2004 | Patchell |
| 6,753,950 B2 | 6/2004 | Morcom |
| 6,765,495 B1 | 7/2004 | Dunning et al. |
| 6,771,185 B1 | 8/2004 | Yoo et al. |
| 6,794,831 B2 | 9/2004 | Leeb et al. |
| 6,825,778 B2 | 11/2004 | Bergan et al. |
| 6,831,576 B2 | 12/2004 | Geiger et al. |
| 6,836,317 B1 | 12/2004 | Perger |
| 6,842,231 B2 | 1/2005 | Nourrcier et al. |
| 6,850,156 B2 | 2/2005 | Bloomfield et al. |
| 6,885,311 B2 | 4/2005 | Howard |
| 6,885,312 B1 * | 4/2005 | Kirkpatrick ............... 340/932.2 |
| 6,917,307 B2 | 7/2005 | Li |
| 6,927,700 B1 | 8/2005 | Quinn |
| 6,946,974 B1 | 9/2005 | Racunas, Jr. |
| 7,026,954 B2 | 4/2006 | Slemmer et al. |
| 7,081,832 B2 | 7/2006 | Nelson et al. |
| 7,106,214 B2 | 9/2006 | Jesadanont et al. |
| 7,116,246 B2 | 10/2006 | Winter et al. |
| 7,119,674 B2 | 10/2006 | Sefton |
| 7,119,715 B2 | 10/2006 | Orita |
| 7,123,166 B1 * | 10/2006 | Haynes et al. ............. 340/932.2 |
| 7,135,991 B2 | 11/2006 | Slemmer et al. |
| 7,148,813 B2 | 12/2006 | Bauer |
| 7,221,271 B2 | 5/2007 | Reime |
| 7,236,102 B2 | 6/2007 | Shimotani |
| 7,250,605 B2 | 7/2007 | Zhevelev et al. |
| 7,253,747 B2 | 8/2007 | Noguchi |
| 7,317,384 B2 | 1/2008 | Lefranc |
| 7,321,317 B2 | 1/2008 | Nath et al. |
| 7,350,945 B2 * | 4/2008 | Albou et al. ................. 362/507 |
| 7,352,972 B2 | 4/2008 | Franklin |
| 7,405,676 B2 | 7/2008 | Janssen |
| 7,417,718 B2 | 8/2008 | Wada et al. |
| 7,426,450 B2 | 9/2008 | Arnold et al. |
| 7,486,204 B2 | 2/2009 | Quintos |
| 7,554,652 B1 | 6/2009 | Babin et al. |
| 7,573,400 B2 | 8/2009 | Arnold et al. |
| 7,635,854 B1 | 12/2009 | Babin |
| 7,640,122 B2 | 12/2009 | Levesque et al. |
| 7,895,007 B2 | 2/2011 | Levesque et al. |
| 7,917,320 B2 | 3/2011 | Levesque et al. |
| 7,957,900 B2 | 6/2011 | Chowdhary et al. |
| 8,242,476 B2 | 8/2012 | Mimeault et al. |
| 2003/0154017 A1 | 8/2003 | Ellis |
| 2003/0189500 A1 | 10/2003 | Lim |
| 2004/0035620 A1 | 2/2004 | McKeefery |
| 2004/0083035 A1 | 4/2004 | Ellis |
| 2004/0135992 A1 | 7/2004 | Munro |
| 2005/0046597 A1 | 3/2005 | Hutchison et al. |
| 2005/0117364 A1 | 6/2005 | Rennick et al. |
| 2005/0187701 A1 | 8/2005 | Baney |
| 2005/0231384 A1 | 10/2005 | Shimotani |
| 2005/0269481 A1 | 12/2005 | David et al. |
| 2005/0270175 A1 | 12/2005 | Peddie et al. |
| 2006/0033641 A1 | 2/2006 | Jaupitre |
| 2006/0145824 A1 | 7/2006 | Frenzel et al. |
| 2006/0147089 A1 | 7/2006 | Han et al. |
| 2006/0149472 A1 | 7/2006 | Han et al. |
| 2006/0180670 A1 | 8/2006 | Acosta et al. |
| 2007/0018106 A1 | 1/2007 | Zhevelev et al. |
| 2007/0061192 A1 | 3/2007 | Chew |
| 2007/0091294 A1 | 4/2007 | Hipp |
| 2007/0096943 A1 | 5/2007 | Arnold et al. |
| 2007/0205918 A1 | 9/2007 | Riesco Prieto et al. |
| 2007/0222639 A1 | 9/2007 | Giles et al. |
| 2007/0228262 A1 * | 10/2007 | Cantin et al. .................. 250/221 |
| 2007/0255525 A1 | 11/2007 | Lee et al. |
| 2008/0006762 A1 | 1/2008 | Fadell et al. |
| 2008/0172171 A1 | 7/2008 | Kowalski |
| 2008/0309914 A1 | 12/2008 | Cantin et al. |
| 2009/0102699 A1 | 4/2009 | Behrens et al. |
| 2009/0251680 A1 | 10/2009 | Farsaie |
| 2009/0299631 A1 | 12/2009 | Hawes et al. |
| 2010/0191418 A1 | 7/2010 | Mimeault et al. |
| 2010/0194595 A1 | 8/2010 | Mimeault et al. |
| 2010/0277713 A1 | 11/2010 | Mimeault |
| 2010/0309024 A1 | 12/2010 | Mimeault |
| 2011/0134249 A1 | 6/2011 | Wood et al. |

FOREIGN PATENT DOCUMENTS

| | | |
|---|---|---|
| CA | 2710212 | 7/2009 |
| DE | 19604338 | 7/2004 |
| DE | 102004035856 | 3/2005 |
| DE | 102006025020 | 11/2007 |
| DE | 202008007078 | 10/2008 |
| DE | 102009013841 | 9/2009 |
| EP | 0318260 | 5/1989 |
| EP | 0476562 | 3/1992 |
| EP | 0494815 | 12/1996 |
| EP | 0838695 | 4/1998 |
| EP | 0612049 | 9/1998 |
| EP | 0988624 | 3/2000 |
| EP | 0912970 | 4/2000 |
| EP | 1034522 | 9/2000 |
| EP | 0798684 | 1/2001 |
| EP | 0779990 | 3/2003 |
| EP | 0935764 | 3/2003 |
| EP | 1296302 | 3/2003 |
| EP | 0789342 | 6/2003 |
| EP | 0784302 | 9/2003 |
| EP | 0866434 | 6/2004 |
| EP | 1521226 | 6/2006 |
| EP | 1049064 | 9/2006 |
| EP | 1048961 | 7/2009 |
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| FR | 2690519 | 10/1993 |
| GB | 2264411 | 8/1993 |
| GB | 2354898 | 7/2003 |
| GB | 2431498 | 4/2007 |
| GB | 2445767 | 7/2008 |
| JP | 2059608 | 2/1990 |
| JP | 0414390 | 5/1992 |
| JP | 04145391 | 5/1992 |
| JP | 09178786 | 7/1997 |
| JP | 2004102889 | 4/2004 |
| JP | 2005-170184 | 6/2005 |
| JP | 2006172210 | 6/2006 |
| JP | 2006521536 | 9/2006 |
| JP | 2007121116 | 5/2007 |
| WO | 8705138 | 8/1987 |
| WO | 9203808 | 3/1992 |
| WO | 9634252 | 10/1996 |
| WO | 9904378 | 1/1999 |
| WO | 0139153 | 5/2001 |
| WO | 0215334 | 2/2002 |
| WO | 03007269 | 1/2003 |
| WO | 2004100103 | 11/2004 |
| WO | 2005008271 | 1/2005 |
| WO | 2006044758 | 4/2006 |
| WO | 2006092659 | 9/2006 |
| WO | 2007071032 | 6/2007 |
| WO | 2007096814 | 8/2007 |
| WO | 2008037049 | 4/2008 |
| WO | 2008154737 | 12/2008 |
| WO | 2009013739 | 1/2009 |
| WO | 2009087536 | 7/2009 |
| WO | 2009104955 | 8/2009 |
| WO | 2009117197 | 9/2009 |
| WO | 2011077400 | 6/2011 |

OTHER PUBLICATIONS

United States Department of Transportation, Federal Highway Administration, Sensor Technology—Chapter 2, Traffic Detector Handbook; Third Edition—vol. 1, FHWA-HRT-06-108, available at http://www.tfhrc.gov/its/pubs/06108/02a.htm on Sep. 16, 2009.

The Vehicle Detector Cleaninghouse, A Summary of Vehicle Detection and Surveillance Technologies used in Intelligent Transportation Systems, Nov. 30, 2000, available at http://www.fhwa.dot.gov/environment/airtoxicmsat/4.htm on Sep. 16, 2009.

United States Department of Transportation, Federal Highway Administration, Department of Environment, Air Quality, Air Toxic MSAT, Monitoring Methods available at http://www.fhwa.dot.gov/ohim/tvtw/vdstits.pdf on Jul. 3, 2007.

United States Department of Transportation, Research and Innovative Technology Administration, 5.3. Infrared Detectors, available at http://ntl.bts.gov/DOCS/96100/ch05/body$_{13}$ ch05_03.html on Sep. 16, 2009.

Kon Tayfun, Thesis, Collision Warning and Avoidance System for Crest Vertical Curves, Virginia Tech, May 4, 1998, Appendix B2, pp. 51-92, published on Digital Library and Archives, University Libraries of Virginia Tech, available at http://scholar.lib.vt.edu/theses/available/etd-43098-201311/unrestricted/APPENDIX-B2.PDF on Sep. 16, 2009.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detectors%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT 85H on Sep. 16, 2009.

Dimitri Loukakos, Active Laser infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

GENEQ Inc., Passive Infrared Detector for Traffic Data Acquisition, Model IR 250, Department of Meteorology, available at http://www.geneq.com/catalog/en/ir250.html on Sep. 16, 2009.

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm, Feb. 21, 2012.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

* cited by examiner

*Primary Examiner* — Brown Vernal
*Assistant Examiner* — John Mortell
(74) *Attorney, Agent, or Firm* — Fasken Martineau

(57) ABSTRACT

A system and a method for detecting availability of a parking space in a parking facility are provided. A first method has the steps of providing a lighting system having at least one visible-light source for illumination of at least part of the parking space. Providing an available space time-of-flight trace. Providing an availability threshold value. Illuminating the at least part of the parking space using the at least one visible-light source. Emitting a status visible-light signal from the visible-light source in the predetermined direction toward the predetermined target in the parking space. Capturing a status reflection trace at the visible-light source. Determining a time-of-flight difference value by comparing the status reflection trace to the available space time-of-flight trace. Comparing the time-of-flight difference value with the availability threshold value and determining a status of the parking space to be one of available and not available. Another method has the steps of providing a lighting system having at least one visible-light source for illumination of at least part of the parking space. Providing a camera. Providing an available space region value. Providing an availability threshold value. Illuminating the at least part of the parking space using the at least one visible-light source. Emitting visible light from the visible-light source in the predetermined direction to the predetermined target in the parking space. Capturing a reflection of the emitted visible light at the camera and determining a status region value. Determining a region difference value by comparing the status region value to the available space region value. Comparing the region difference value with the availability threshold value and determining a status of the parking space to be one of available and not available.

22 Claims, 10 Drawing Sheets

FIG_7

US 8,723,689 B2

PARKING MANAGEMENT SYSTEM AND METHOD USING LIGHTING SYSTEM

CROSS-REFERENCE TO RELATED APPLICATIONS

This application is a national phase entry of PCT Application Number PCT/CA2008/002248 entitled "PARKING MANAGEMENT SYSTEM AND METHOD USING LIGHTING" filed on Dec. 19, 2008, which in turn claims priority of US provisional patent applications nos. 61/015,738 and 61/015,867, both filed on Dec. 21, 2007 by Applicant, the specifications of which are hereby incorporated by reference.

TECHNICAL FIELD

The invention relates to the management of parking facilities, more particularly, to the detection of available parking spaces in a parking facility using a lighting system.

BACKGROUND OF THE ART

Growth of several metropolitan areas, urban revitalization and the mobility of our society using vehicles has increased the need for an efficient transport infrastructure. The demand for parking is increasing and represents a major concern. Advanced Parking Management Systems (APMS) are used to assist motorists in finding parking spaces quickly. APMS can provide real-time information of parking space occupancy for several facilities. This information is used to generate parking availability messages that are displayed by message information boards through several different means.

System accuracy is a critical factor. The method used for vehicle counting is an important aspect of the APMS. Two types of systems are generally used for counting. The first one is based on entry/exit counters. Usually, inductive loop counters, RF tags and video detection are used. The second method is based on space occupancy detectors and use ultrasonic, inductive loop, infrared or microwave sensors. In that case, each sensing unit is installed over individual lot spaces and detects if the lot is available or not. Entry/exit counters are not as accurate as individual space sensors but are easier to implement. The installation of space sensors or the availability of mounting space for detectors in pre-existing parking facilities can be a problem. The ability to communicate data for each individual space is also an important issue to consider. The degree of complexity of the installation of the sensors can have an important impact on costs for an APMS and is another issue for these systems.

Some systems used for detecting available parking spaces use an emitter and a receiver. A signal is transmitted from the emitter to the receiver to detect an available space. When the receiver is hidden behind a vehicle, the signal will not be able to reach the receiver and the system will conclude that a vehicle is present. Other systems use optical sensors which read barcodes written on the pavement. When the optical sensor is not able to read the bar code, the system concludes that a vehicle is parked in the parking space.

In a vision-based system, each camera is able to survey more than one parking space. Some are able to identify features such as plate number, color, make and model of a vehicle. If such precision of detection is required, the performance of the camera is critical, notably in terms of resolution. Also, vision-based systems need a high bandwidth to communicate the data. Some smart cameras have an embedded processing system but are expensive. Other vision-based systems use stereoscopic principles to determine the occupancy of a parking space.

For all of these prior art solutions, costly installation is necessary. Typically, sensors and cameras must be mounted on walls, on a pillar, on a rail or must be embedded in the parking space. Prior art parking management systems are stand-alone systems that do not integrate within the current lighting infrastructure, using their own power line and, own cable interfaces. Some sensors are powered by batteries and require maintenance over time.

SUMMARY

It is therefore an aim of the present invention to address at least one of the above mentioned difficulties It is an object of the present invention to provide a lighting system capable of detecting the presence of vehicles for advanced parking management.

It is a further object of the present invention to provide a method for detecting the presence of vehicles for advanced parking management.

By integrating detection of the availability of a parking space within a LED lighting fixture, the benefits for the parking operator are important: by the return through low cost installation, low cost maintenance, lower energy cost and by improvement of parking efficiency.

A system and a method for detecting availability of a parking space in a parking facility are provided.

According to a first aspect of the present invention, there is provided a method for determining an availability of a parking space comprising: providing a lighting system having at least one visible-light source for illumination of at least part of the parking space. Providing an available space time-of-flight trace. Providing an availability threshold value. Illuminating the at least part of the parking space using the at least one visible-light source. Emitting a status visible-light signal from the visible-light source in the predetermined direction toward the predetermined target in the parking space. Capturing a status reflection trace at the visible-light source. Determining a time-of-flight difference value by comparing the status reflection trace to the available space time-of-flight trace. Comparing the time-of-flight difference value with the availability threshold value and determining a status of the parking space to be one of available and not available.

According to a second aspect of the present invention, there is provided a method for determining an availability of a parking space comprising: providing a lighting system having at least one visible-light source for illumination of at least part of the parking space. Providing a camera. Providing an available space region value. Providing an availability threshold value. Illuminating the at least part of the parking space using the at least one visible-light source. Emitting visible light from the visible-light source in the predetermined direction to the predetermined target in the parking space. Capturing a reflection of the emitted visible light at the camera and determining a status region value. Determining a region difference value by comparing the status region value to the available space region value. Comparing the region difference value with the availability threshold value and determining a status of the parking space to be one of available and not available.

According to a third aspect of the invention, there is provided a system for detecting availability of a parking space in a parking facility, comprising: a powered lighting module having at least one visible-light source driven by an illumination driver, an optical detector for capturing a status reflection trace at said lighting module, a lighting module processor for controlling said illumination driver and said optical detector and receiving said status reflection trace, a powered central unit having a memory, a central unit processor and a network for communicating information between said processor and said central unit.

BRIEF DESCRIPTION OF THE DRAWINGS

Having thus generally described the nature of the invention, reference will now be made to the accompanying drawings, showing by way of illustration a preferred embodiment thereof and in which.

It will be noted that throughout the appended drawings, like features are identified by like reference numerals.

DETAILED DESCRIPTION

Typically, illumination for parking facilities is made by various lighting modules using metal halide, high pressure sodium or fluorescent lights. Recently, due an increase in performance needs and cost reductions, LEDs are now another source of illumination. LEDs have several advantages notably in terms of lifetime, efficiency, color rendering index (CRI) and robustness.

Figure 1:
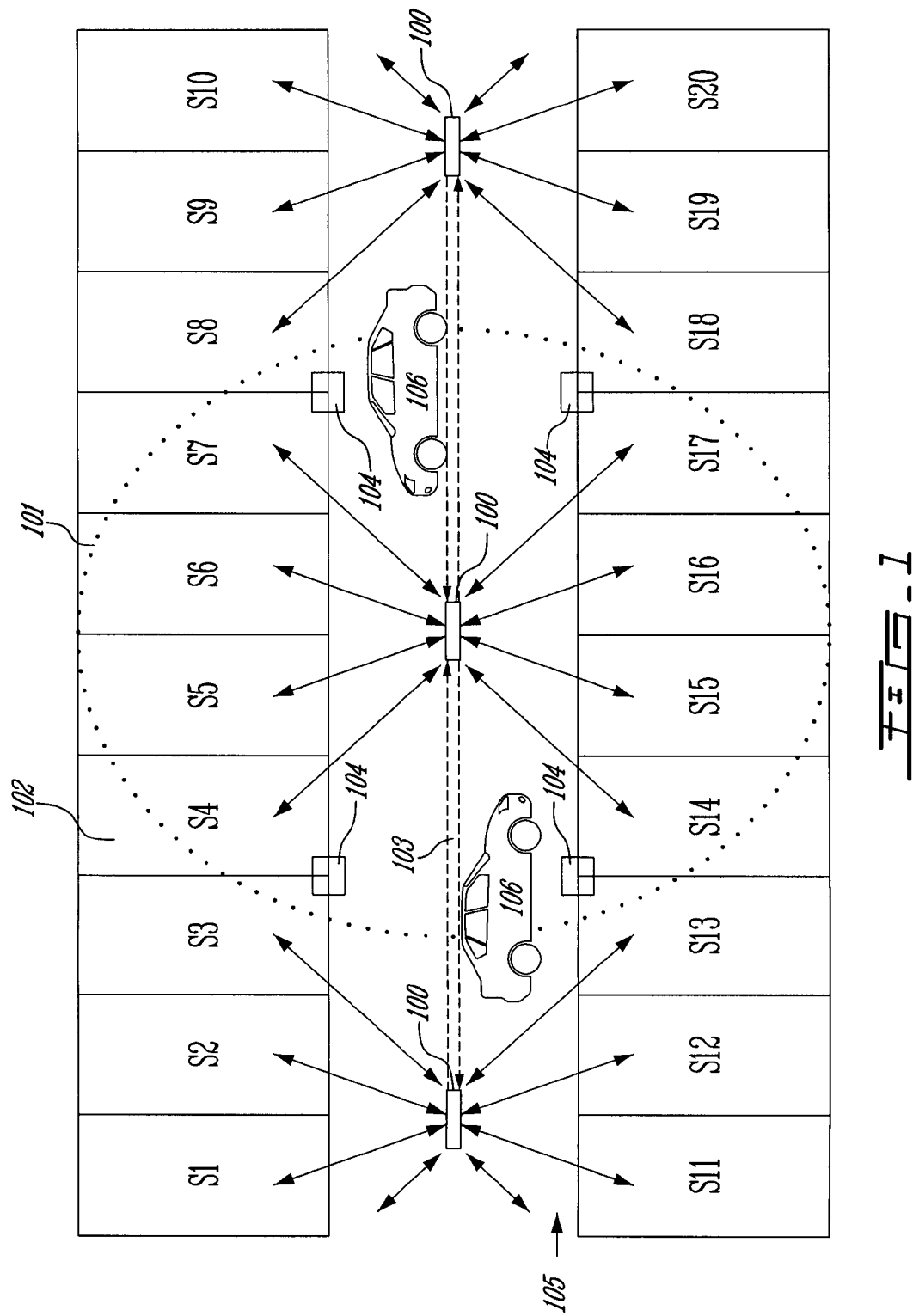
FIG. 1 shows an example of a parking facility equipped with the system of an embodiment of the invention in which lighting modules are provided above and in the middle of the vehicle passageway, each lighting 8 parking spaces.

An example of a parking facility equipped with the system of an embodiment of the invention is shown in FIG. 1. The system is particularly useful for parking garages. Lighting devices 100 are used for illumination of an illuminated zone 101. The network of lighting devices 100 has the first purpose of illuminating all of the parking area and secondly has to meet illumination requirements. Indeed, minimum horizontal illuminance, maximum illuminance, uniformity, vertical illuminance and minimum color rendering index are important factors to consider when designing a lighting system for a parking garage. In a parking garage, the mounting height is typically between 1.8 meter to 3 meters and the devices need to illuminate a target area of a few tens of square meters.

Figure 3:
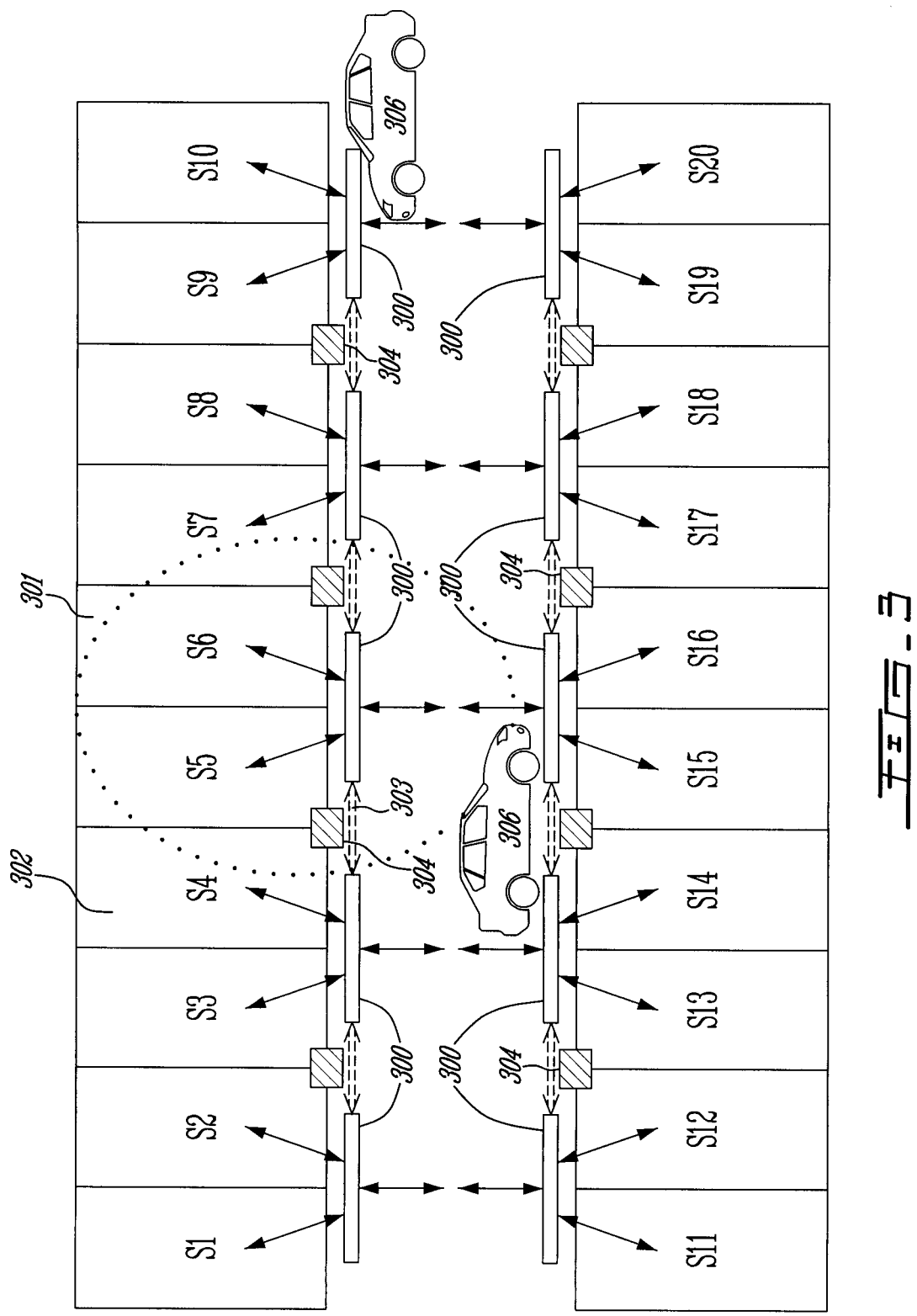
FIG. 3 shows an example of a parking facility equipped with the system of an embodiment of the invention in which the lighting modules are provided above and on each side of the vehicle passageway, each lighting two parking spaces.

FIG. 1 shows a configuration where lighting devices 100 are placed in the middle of the passageway 105 and illuminate several parking spots 102 on both sides. In this example, the parking spaces are numbered through S1 through S20. FIG. 3 shows another configuration where lighting devices 100 are placed at the intersection of a passageway and two parking spaces. Several other configurations are possible.

Each device 100 provides an occupancy status for at least one individual parking space 102. This information is transmitted by the communications network 103 to a central computer (not shown). The device has at least one field of view for the detection and, in the calibration process, will take into consideration permanent obstacles, such as structural pillars 104 which could be obstructing part of the field of view.

Figure 2:
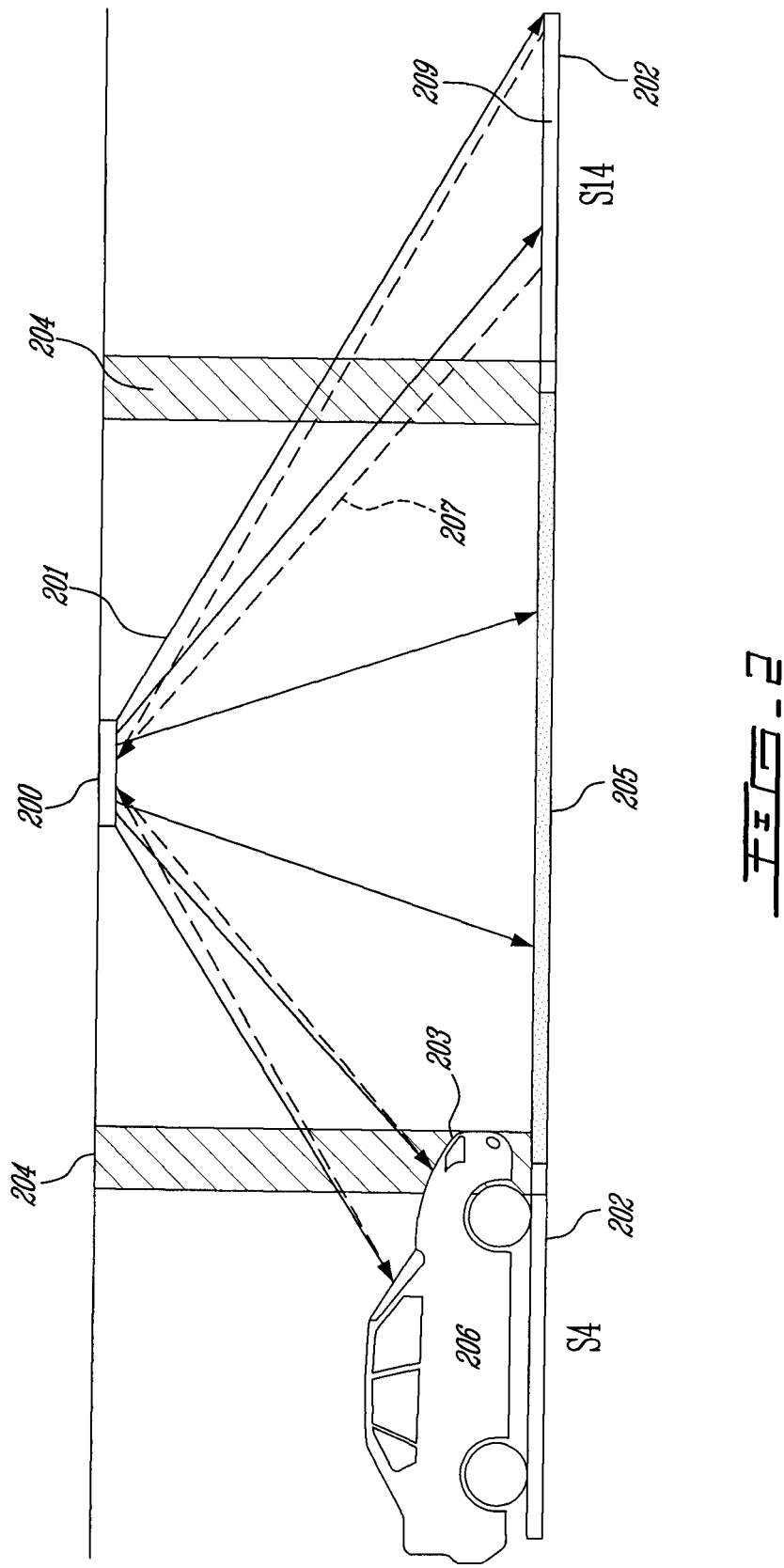
FIG. 2 shows a cross section of the example of FIG. 1.
Figure 4:
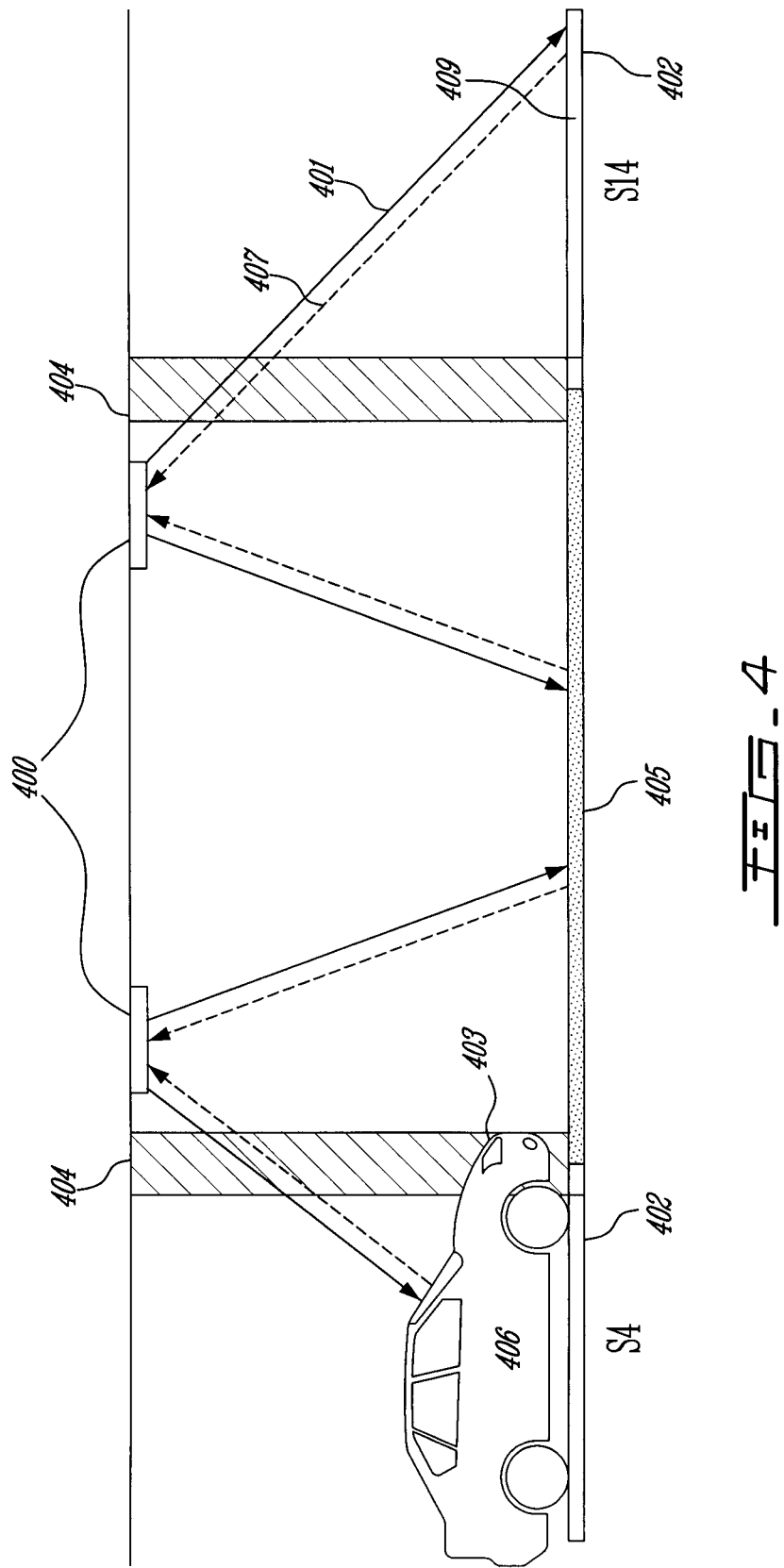
FIG. 4 shows a cross section of the example of FIG. 3.

FIG. 2 and FIG. 4 show a cross section of the examples of FIGS. 1 and 3 respectively. Part of the illumination light 201 is directed towards each parking space and towards the passageway and reaches the floor of the parking facility 202 or a vehicle 203. A part of the light 204 is backscattered to the lighting device 100 and will be received by the detector inside the lighting device 100. In these examples, vehicle 206 is parked at space S4 which faces space S14 and is next to a pillar 104.

Figure 5:
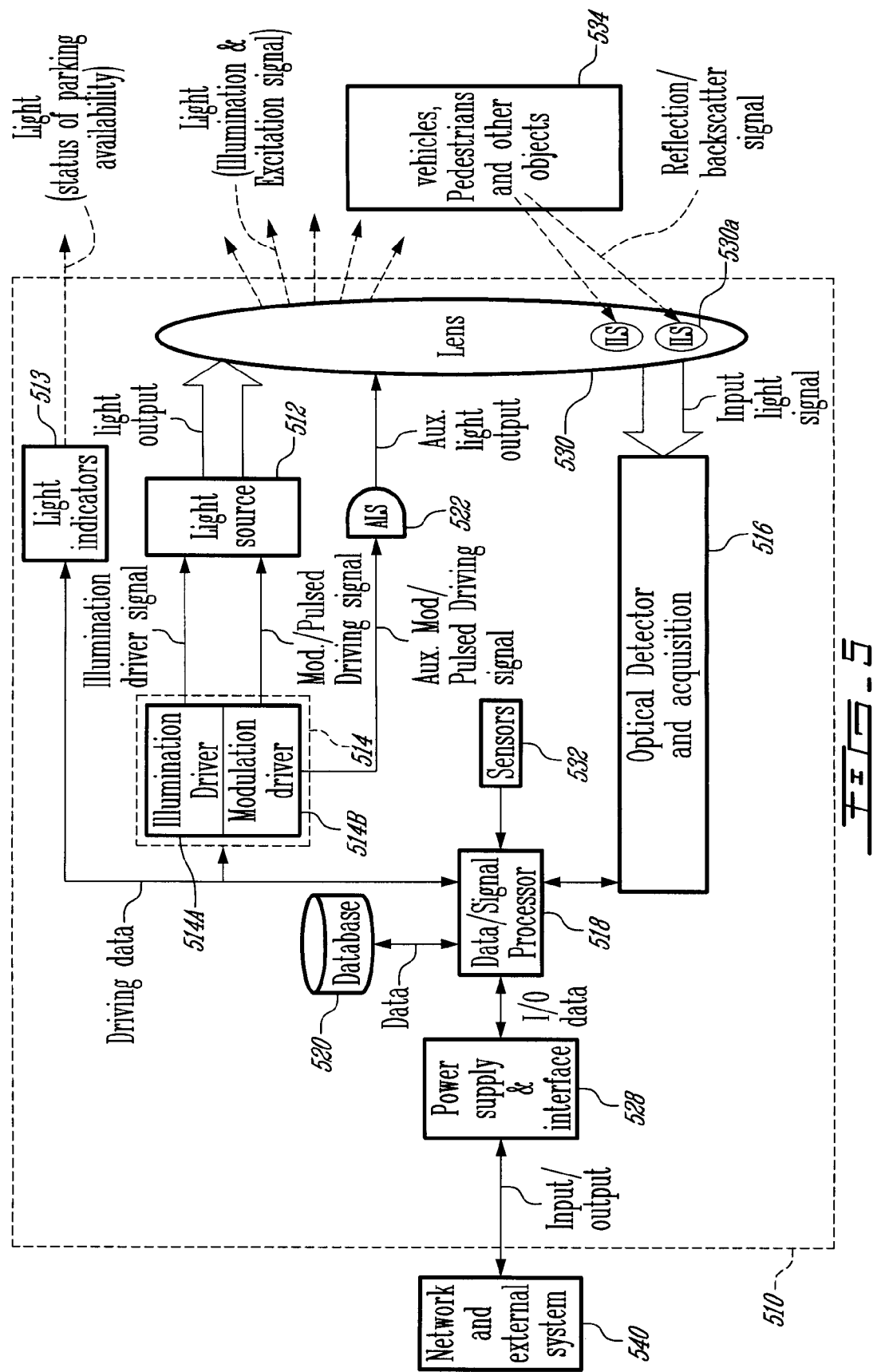
FIG. 5 is a block diagram illustrating an embodiment of the lighting system.

FIG. 5 is a block diagram illustrating an embodiment of the lighting system having the capability of detecting the occupancy of parking spaces and controlling the illumination to act as a feedback signal for users. The system 510 has visible-light sources 512 and 513. The visible-light source 512 has, as a first purpose, the emission of visible light for illumination to assist human vision and the light indicators 513 have the purpose of indicating the status of a parking site by visual communication of information, like signaling. The primary purpose of emitting light is controlled according to specific criteria like optical power, field of view and light color, to meet requirements defined through a number of regulations for parking applications. The illuminescence requirement is determined by the layout of the parking facility, traffic safety issues and by the needs in terms of visibility and security of motorists and pedestrians. Illumination for parking garages is dependent on the low mounting height for the lighting modules and the relatively low surface reflectance. The Illuminating Engineering Society of North America (IESNA) recommends a minimum horizontal illuminance of 10 Lux and a maximum/minimum horizontal uniformity ratio of 10:1 for parking garages. The level of illuminance is higher for the ramps (day: 20 Lux, Night: 10 lux) and for entrance areas (day: 500 Lux, night: 10 Lux). The required level for vertical illuminance is typically half of the required level for horizontal illuminance. In the preferred embodiment, the visible-light source 512 has one or more solid-state lighting devices, LEDs or OLEDs for example.

The visible-light source 512 is connected to a source controller 514, so as to be driven in order to produce visible light. In addition to emitting light, the system 510 performs detection of objects and particles (vehicles, passengers, pedestrians, airborne particles, gases and liquids) when these objects are part of the environment/scene illuminated by the light source 512. Accordingly, the source controller 514 drives the visible-light source 512 in a predetermined mode, such that the emitted light takes the form of a light signal, for instance by way of amplitude-modulated or pulsed light emission.

These light signals are such that they can be used to provide the illumination level required by the application, through data/signal processor 518 and source controller 514, while producing a detectable signal. Accordingly, it is possible to obtain a light level equivalent to a continuous light source by modulating the light signal fast enough (e.g., frequency more than 100 Hz) to be generally imperceptible to the human eye and having an average light power equivalent to a continuous light source.

In an embodiment, the source controller 514 is designed to provide an illumination drive signal, such as a constant DC signal or a pulse-width modulated (PWM) signal, that is normally used in lighting systems to produce the required illumination and control the intensity. The illumination drive signal is produced by the illumination driver sub-module 514A of the controller 514.

The modulated/pulsed drive signal is produced by a modulation driver sub-module 514B of the controller 514. The amplitude of short-pulse (typ. <50 ns) can be several times the nominal value while the duty cycle is low (typ. <0.1%). The modulation can be up to several MHz.

The modulator driver 514B can also be used to send data for optical communication. Both driving signals can be produced independently or in combination. Sequencing of the drive signals is controlled by the data/signal processor 518. The light source 512 can be monitored by the optical detector and acquisition 516 and the resulting parameters sent to the data/signal processor 518 for optimization of data processing.

An alternative for sourcing the light signal for detection involves an auxiliary light source (ALS) 522, which can be a visible or non-visible source (e.g., UV or IR light, LEDs or laser) using the modulation driver 514B. The auxiliary light source 522 provides additional capabilities for detecting objects and particles. IR light can be used to increase the performance and the range of the detection area. IR lights and other types of light can be used to detect several types of particles by selecting specific wavelengths. The auxiliary light source 522 can also be useful during the installation of the system by using it as a pointer and distance meter reference. It can also be used to determine the condition of the lens.

The visible-light source 512 is preferably made up of LEDs. More specifically, LEDs are well suited to be used in the lighting system 510 since LED intensity can be efficiently modulated/pulsed at suitable speeds. Using this feature, current lighting systems already installed and featuring LEDs for standard lighting applications can be used as the light source 512 for detection applications, such as presence detection for energy savings, distance measurements, smoke detection and spectroscopic measurements for gas emission.

The system 510 has at least one lens 530 through which light is emitted in an appropriate way for the parking applications. At least one input lens section 530a of at least one lens 530 is used for receiving the light signal, for instance reflected or diffused (i.e., backscattered) by the objects 534. This input lens section 530a can be at a single location or distributed (multiple zone elements) over the lens 530 and have at least one field of view. Several types of lens 530 can be used, such as Fresnel lenses and fisheye lenses for instance. A sub-section of the lens 530 can be used for infrared wavelength. A sub-section of the lens 530 can be used for optical data reception.

A detector and acquisition module 516 is associated with the visible-light source 512 and/or auxiliary light source 522 and the lens 530. The detector and acquisition module 516 is an optical detector (or detectors) provided so as to collect light emitted by the light source 512/ALS 522 and backscattered (reflected) by the vehicle/pedestrian 534. Detector and acquisition module 16 can also monitor the visible-light source 512 or auxiliary light source 522. The light signal can also come from an object 534 being the direct source of this light (such as a remote control) in order to send information to the data/signal processor through the optical detector module 516. The optical detector and acquisition module 516 is, for example, composed of photodiodes, avalanche photodiodes (APD), photomultipliers (PMT), complementary metal oxide semiconductor (CMOS) or charge coupled device (CCD) array sensors, 3D camera sensors (time-of-flight depth sensor), with appropriate acquisition circuits to digitalize the data.

Filters are typically provided with the detector module 516 to control background ambient light emitted from sources other than the lighting system 510. Filters can also be used for spectroscopic measurements and to enhance performance of the optical detector module 516.

The data/signal processor 518 is connected to the detector and acquisition module 516 and receives digitalized data. The data/signal processor 518 is also connected to the source controller 514, so as to receive driving data there from. The data/signal processor 518 has a processing unit (e.g., CPU) so as to interpret the data from the detector and acquisition module 516, in comparison with the driving data of the source controller 514, which provides information about the predetermined mode of emission of the light signals emitted by the visible-light source 512.

Accordingly, information about the vehicle and pedestrian (e.g., presence, distance, etc.) is calculated by the data/signal processor 518 as a function of the relation (e.g., phase difference, relative intensity, spectral content, time of flight, etc.) between the driving data and the detected light data. A database 520 may be provided in association with the data/signal processor 518 so as to provide historical data (serial number, date of installation, etc), calibration (data store during the calibration process, threshold for instance), and tabulated data to accelerate the calculation of the object parameters (signal reference for instance).

In view of the calculation it performs, the data/signal processor 518 controls the source controller 514 and thus the light output of the visible-light source 512. For instance, the visible-light source 512 may be required to increase or reduce its intensity, or change the parameters of its output. For example, changes in its output power can adapt the lighting level required in daytime conditions versus nighttime conditions. The system can also slightly increase the level of luminance when activities are detected. In the case of the configuration of FIG. 3, light oriented towards the parking area can be increased when events are detected within the parking space without increasing light oriented towards the aisle (the system controls the dimming level for the aisle or passageway and parking area separately) Another example is to control the lighting source to be used as an indicator of an available parking space for users of the parking facility by emitting short "flashes" to indicate the availability of a parking space in the vicinity of the lighting module. Light indicators 513 have also the function to indicate the availability of a parking space. Typically, light indicators 513 are made with red and green LEDs to fulfill this function.

The system 510 has sensors 532 connected to the data/signal processor 518. Sensors 532 can be passive infrared sensors, temperature sensors, day/night sensors, etc. Sensors 532 are useful during the installation of the system and during operation of the system. For instance, data from a passive infrared sensor can be useful to detect the presence of a pedestrian and adapt the level of light output or to transmit the information of a presence of pedestrian to the central computer. Information from sensors 532 and data/signal processor 518 and light from light source 512 and auxiliary light source 522 can be useful during installation, in particular for adjusting the field of view of the optical receiver. The system 510 has a power supply and interface 528. The supply input receives a nominal voltage to operate the system, typically 120Vac or 240Vac. This input voltage is transformed to supply the lighting source and electronic circuits. The interface section is connected to a Data/signal processor and communicates information to an external system 540 (via wireless, power line, Ethernet, etc.). This communicated information is related to the occupancy of each parking space. Data transmission from sensors or visual data from 2D sensors can also be used, notably for security purposes. Information from the lighting network is sent to central computer that controls the advanced parking management system. Central computer 540 can configure and control each lighting module in the network. For instance, a parking space can be reserved for a specific function and the central computer can set the lighting module to indicate that this space is not available even if no vehicle is detected by the sensor of the lighting module. Lighting modules can be configured as a mesh network. Information can be shared between each module in the network.

Figure 6:
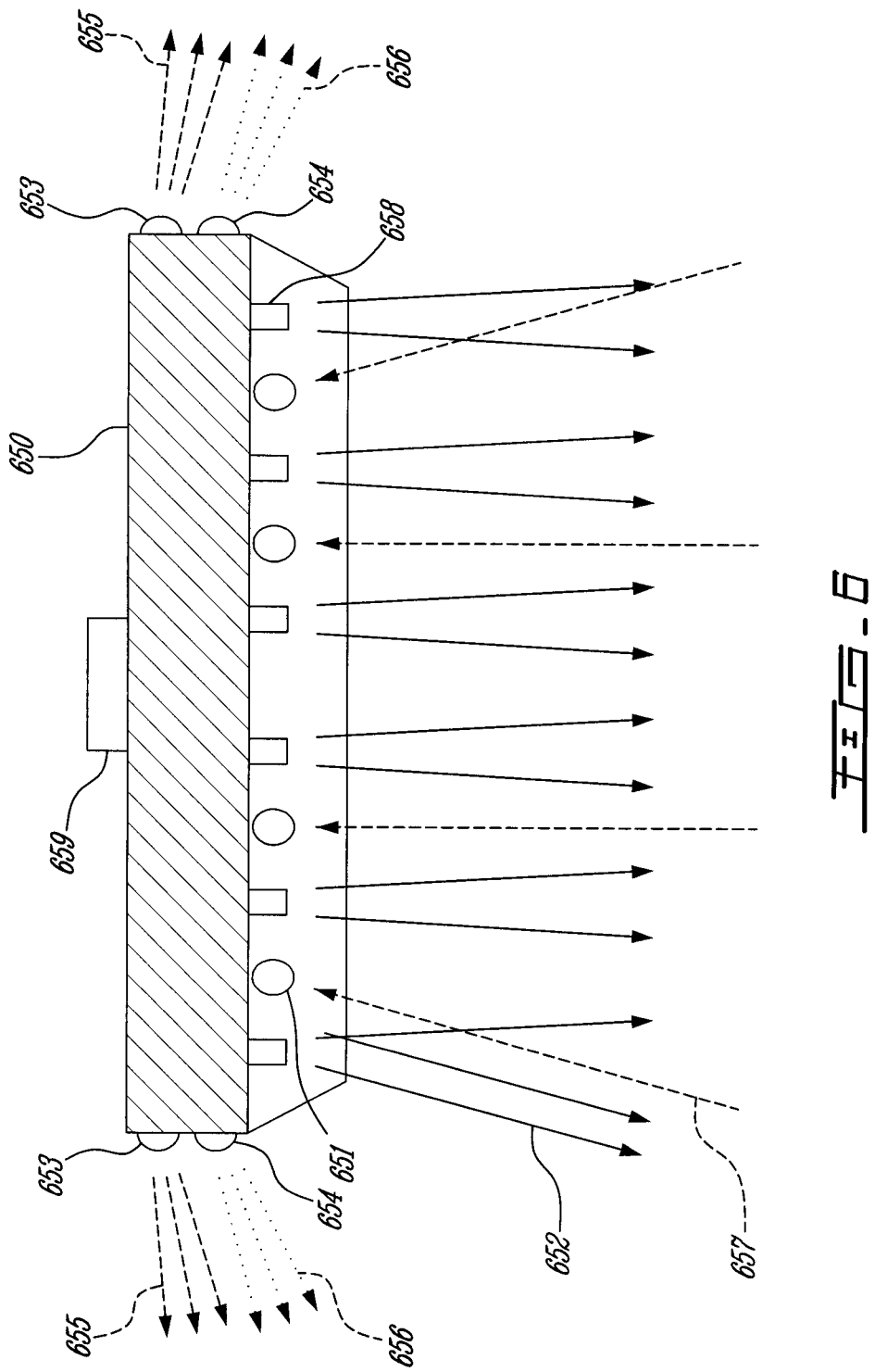
FIG. 6 shows an embodiment of a lighting module.

FIG. 6 shows an embodiment of modular lighting system using LEDs as a lighting source. The lighting source 600 has LEDs 601 emitting light illumination 602. The lighting source 600 has green light indicators 603 and red light indicators 604 emitting green optical signal 605 and red optical signal 606 respectively and indicating the status of a parking spaces (availability/occupancy). The backscattered returned light signal from a parking space 607 is detected by the optical detector 608 and processed by the lighting module 600. The power supply and interface 609 of lighting module 600 receive power from the electrical network and communicate to a central computer. Several lighting modules are required to illuminate a parking garage. Each lighting module has to illuminate a target area. For example, a 7.5 meters×7.5 meters (56 m$^2$) area is a typical size for this application. In that case, with lighting modules installed at a 3-meter height, assuming the average illuminance is 30 Lux (3 times the minimum based on the IESNA recommendation) over the 56 m$^2$, the total luminous flux required is approximately 1700 lumens. Nowadays, performance for some LEDs has reached more than 100 lumens. Few LEDs are required in a lighting module for this lighting purpose. Obviously, effects of temperature (the output of LEDs drops when temperature increases), degradation of performance over the lifetime of the lighting system and the efficiency of the optical components need to be taken into account when designing the system. Optical design plays an important role in optimizing the illumination over the target area. Lens optics are required to distribute uniformly the light to meet recommended ratio of uniformity.

Detection Based on the Time of Flight Principle

The time of flight principle is especially well suited for a parking management system. The range for the detection is relatively short (typically less than 10 m) and the reflected signal is relatively strong. The requirements for accuracy and refresh rate are relatively low. The power of the source does not need to be high. In fact, only a one bit resolution is needed to determine the occupancy of a parking spot using relative distance measurement namely whether a vehicle is present or absent. However, the electronic circuits still need to detect small signals with a few nanosecond of resolution. Moreover, when a LED light source with pulse width modulation (PWM) is used as the source for detection and ranging, the rise time for the signal source could be several tens and even hundreds of a nanosecond.

In order to detect occupancy of a parking space at a low cost, the following method can be used. A LED light source is used for illumination with a PWM circuit to control the intensity of illumination. The same PWM LED light source is also used as a source for detection and ranging measurement. An optical detector and acquisition sub-system samples the reflected or backscattered returned light signal from a parking space. The distance is estimated and compared to the distance to the floor measured during the calibration. The status of the occupancy of the parking space is determined and sent to an external system.

During the calibration process, a threshold is set to discriminate the presence or the absence of a vehicle in the parking space. For example, the distance between the floor of a parking space and the lighting module can be 6 meters. The time-of-flight trace of the reflection of the optical signal between the lighting module and the floor is stored in the memory of the lighting module. When a vehicle is displaced into the parking space, the distance for the optical reflection path of the light is shorter and the time-of-flight trace will shift a few nanoseconds earlier (ex.: 10 ns for a distance change of 1.5 meter). A threshold of 5 ns can be set to clearly define the status of the occupancy of the parking space.

At least one detector is used per parking space. Several detectors can be multiplexed and can use the same acquisition circuit. One detector can be used with different fields of view when sequential sources illuminate different sections of the scene. Time-of-flight depth sensors or 3D imaging sensors can also be used as detectors for the system. Mechanical adjustment can be required to set the right position of the field-of-view (FOV) of the sensor, particularly when only one FOV per parking space is installed. When a plurality of FOVs are available per parking space, selection of at least one FOV per parking space is determined during the installation typically using a computer communicating with the lighting module.

Figure 7:
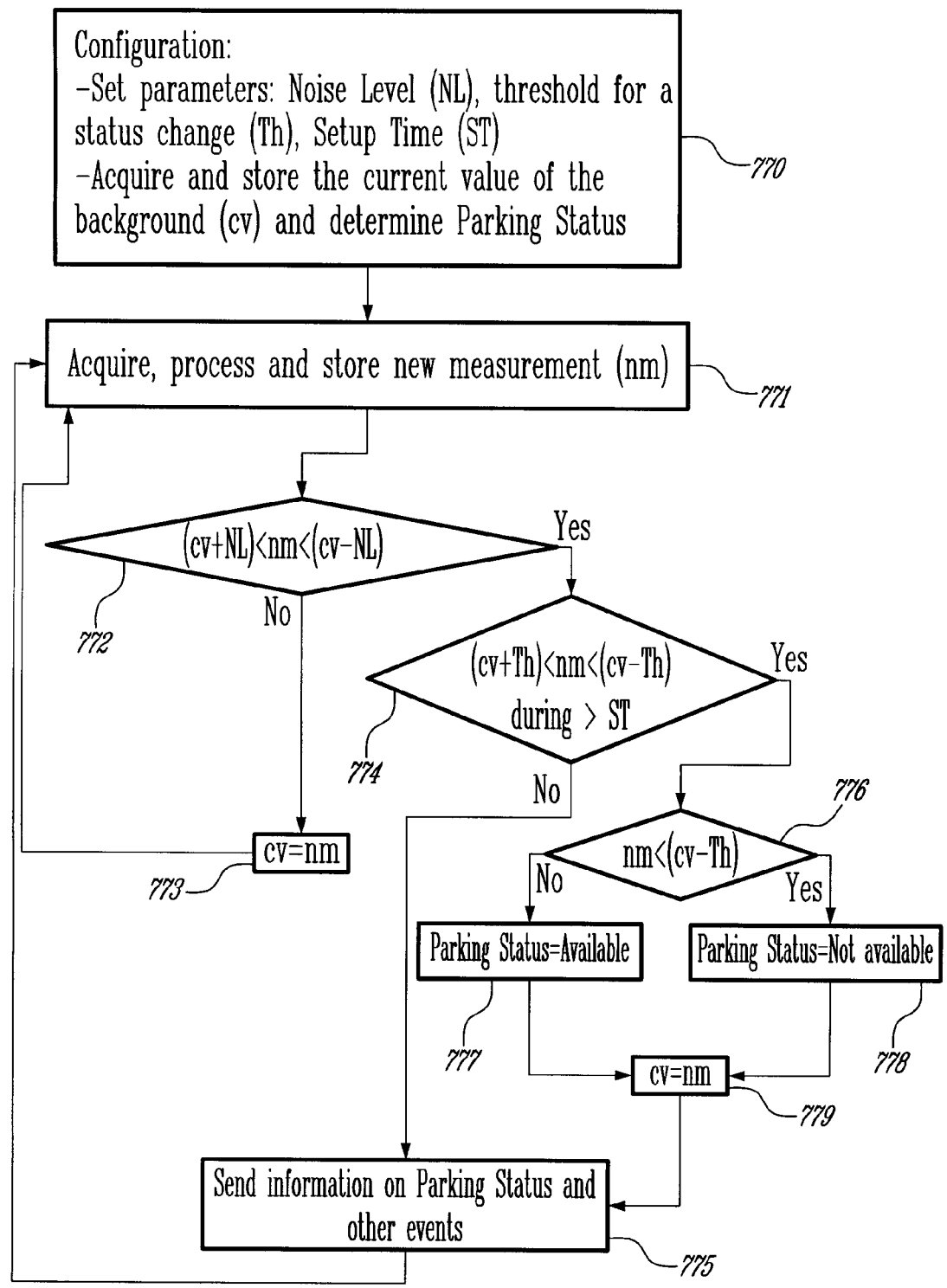
FIG. 7 is a flowchart of an embodiment of the system which uses of time-of-flight technique.
Figure 8:
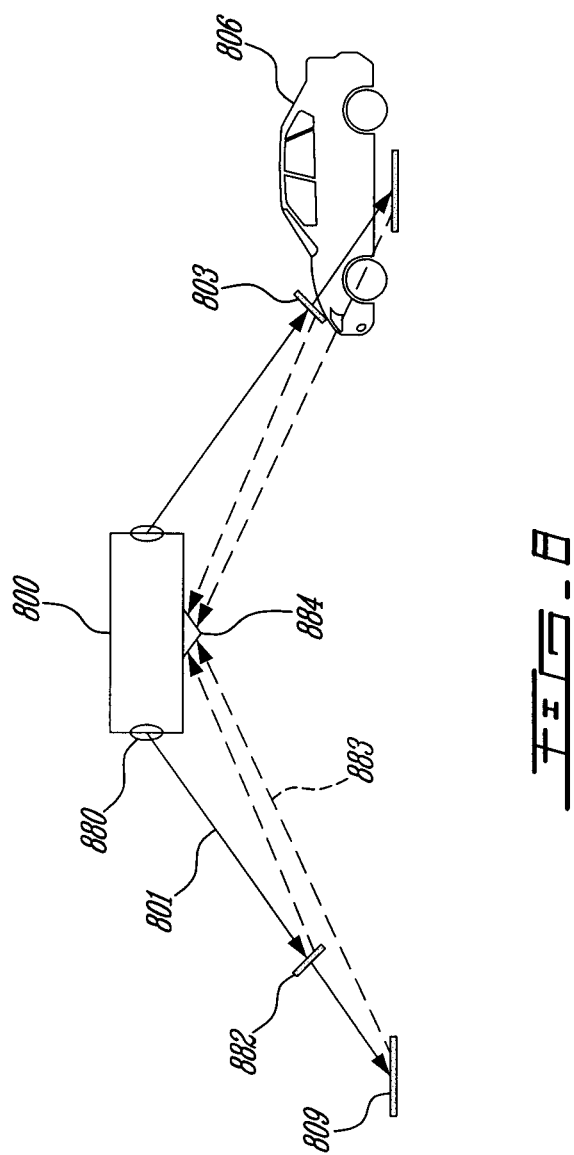
FIG. 8 illustrates an embodiment of the system which uses a triangulation technique.

FIG. 7 is a flowchart representing one of the methods used to obtain measurement and determine parking space occupancy. A source emitting visible wavelengths or non-visible wavelengths generates a signal containing pulses which can be very short (typically several nanoseconds up to few tens of nanoseconds) or generates a typical PWM signal. In this last case, one can use an AC coupler in the optical detector and acquisition unit which accentuates the transitions enabling recordal of the shift measurement. One can also use a modulated source which incorporates a DC component.

The detection circuit detects the backscattered signal and the system acquisition and processing determines the delay between the signals sent and received. This delay is determined in part by the distance of the background or the object (ex: parking ground or a vehicle) which is present in the field of view. It is also determined by the delays generated by the electronic circuits. These circuits may introduce a significant drift in the delays. This drift is relatively slow, generally due to the thermal variation.

Starting from the measured delay, the Data/Signal Processor calculates the relative variation between the new measurement of the delay and the previous delay. A significant reduction in the shift indicates that an object closer to the detector was detected in the field of view (ex.: a new vehicle entering in the parking space), while a significant increase in the shift indicates that an object was removed from the field of view (ex.: a vehicle leaving the parking space).

During configuration, a Noise Level parameter (NL, typically in ns) is initialized in order to determine what is considered a significant variation with respect to the system noise. A Threshold parameter (Th, typically in ns) is also initialized during the configuration in order to determine what is considered a significant variation representing a change in the parking space occupancy (arrival or departure of vehicle). The reading is taken for a sufficiently long period in order to discriminate events related to the parking of a vehicle versus events related to other activities (the crossing of a pedestrian, vehicle partially covering the field of view). A Setup Time parameter (ST, typically in ms) is initialized during the configuration to discriminate between two types of events: arrival or departure of a vehicle in the parking space versus other activities. If the status of the parking space changes or if no event is observed, the measurement of the delay will contribute as the reference for the next measurement. The current value of the current background during initialisation of the system and the state of the parking status are stored.

With specific reference to FIG. 7, configuration is performed 770. A new measurement is acquired, processed and stored 771. It is compared 772 to detect any fluctuation greater than the noise level NL. If no fluctuation is detected, the new measurement nm replaces the former "current value" cv 773. But if a significant fluctuation is detected, a new comparison 774 is made to discriminate between modification of the parking status and other activities based on the duration and the level of the fluctuation. In the case where the fluctuation is shorter than the Threshold Th or lasts less than the Setup Time ST, information about activity events is sent 775 to an external system. In the case of long fluctuations and lasting longer than the Threshold for status change, comparison is made 776 to define if the status is available 777 or not available 778. The new measurement nm replaces the former "current value" cv (779) and parking status is sent 775 to the external system. Information data regarding detection of events in the aisle is also transferred to the computer of the external system (ex: passing of vehicle). This information can notably be used by the central system collectively with the information of movement in a parking area for security reasons.

All the information related to the events is transferred by interface to the computer. This information allows the central computer to update its database information concerning the occupancy of parking spaces, to modify the parking signal indicators integrated within the lighting module for the occupancy of the parking spaces, to indicate to the vehicles in the aisle by means of these indicators of the parking space occupancy and warn of movement notably for safety applications (ex.: vehicle backing from a parking space) and to control the level intensity of lights within the parking to facilitate the management of the parking. During installation, a central computer or a local computer allow the configuration of each lighting module part of the lighting network (upgrade, set parameters, etc.) and to calibrate and to determine the start of configurations. The parameters may be modified subsequently.

Detection Based on Triangulation

This method uses sequential illumination sources and a camera. The lighting device 800 illuminates sequentially the scene by regions at a frequency imperceptible to the human eye. Sub-sections 880 of the lighting device 800 illuminate at least one region 801 over a certain number of parking spaces. At least one camera 884 located at a certain distance from the sub-section 880 of the lighting device 800 integrates the reflection signal 883 which originates from this specific lighting signal 801. During the calibration process, without any vehicle, the lighting signal 801 reaches the floor 809 and the reflected signal 883 is captured by the camera 884. The shape of the illumination of the region is stored in the database. When vehicles are parked in the parking spaces, the lighting signal 801 is reflected from the tip of the vehicle 803 in the field of view to the camera 884 at a different angle and the camera 884 can detect a modification in the shape of the illumination of the region and can estimate the probability of the occupancy of the parking space. The distance between sub-sections 880 and camera 884 permits the use of triangulation principle. For instance, if sub-sections 880 illuminate an available parking space with a pattern, a line for example, this pattern is captured by the camera. When a vehicle enters in the parking space, the pattern seen by the camera will change (for example, a line will have transitions) and this modification of the pattern is used as the information of the presence of a vehicle.

Auxiliary light sources can be used to generate specific lighting patterns in the parking spaces for detection purposes. Clusters of pixels can be defined during calibration as targets to exploit during operation. This selection can be made using calibration software installed in the computer of the external system.

Figure 9:
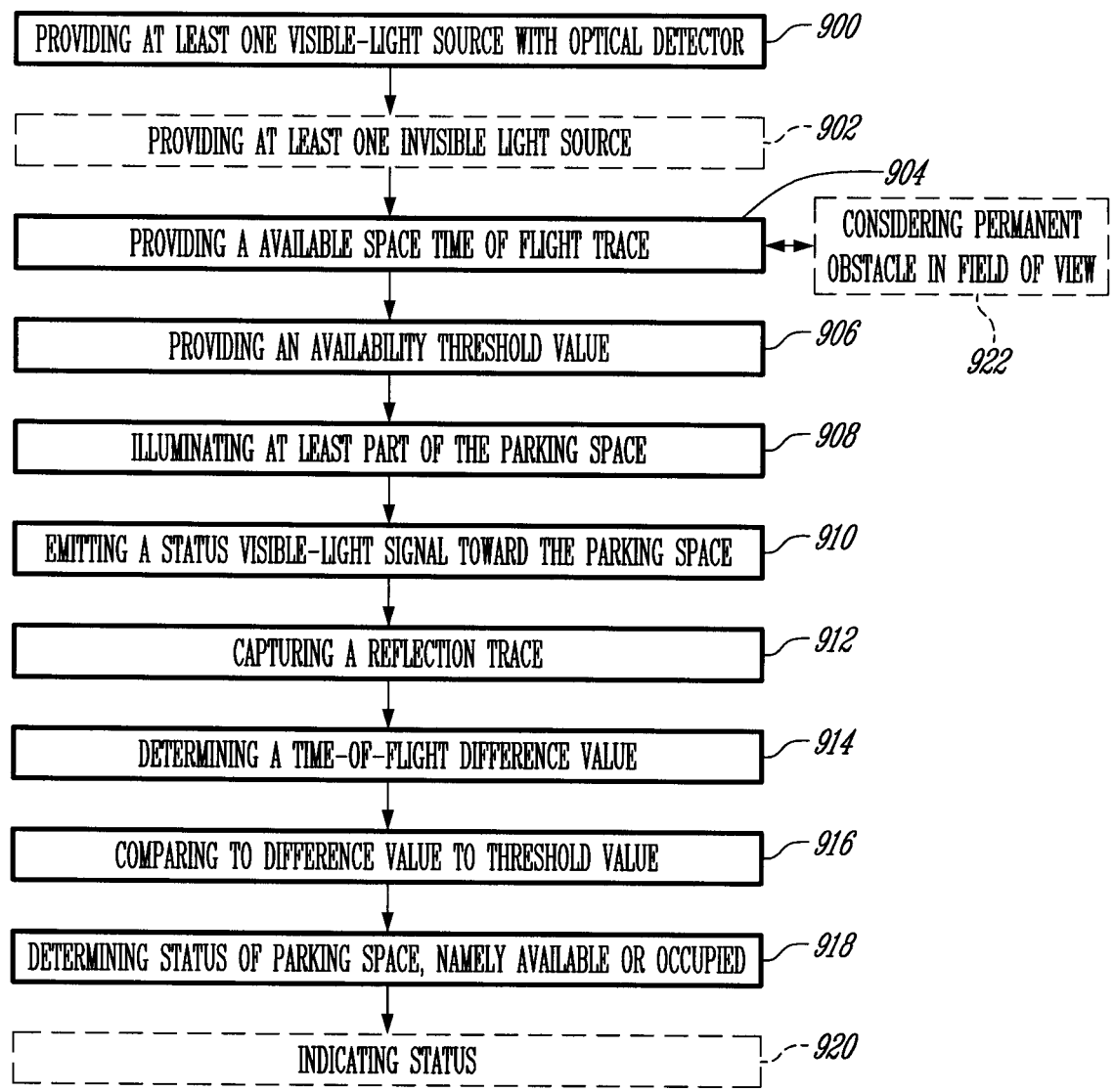
FIG. 9 is a flow chart of the main steps of an embodiment of the invention.

In summary, with reference to FIG. 9, one method for detecting availability of a parking space in a parking facility comprises the following steps. Providing a lighting system having at least one visible-light source for illumination of at least part of the parking space 900. Providing an available space time-of-flight trace 902, the available space time-of-flight trace being a trace, captured by a sensor of the visible-light source, of a reflection of an available space visible-light signal emitted from the visible-light source, in a predetermined direction toward a predetermined target, in the parking space, when the parking space is available, on the predetermined target. Providing an availability threshold value 904, the availability threshold value being a difference value from the available space time-of-flight trace at which the 1.0 parking space is determined to be available. Illuminating the at least part of the parking space using the at least one visible-light source 908. Emitting a status visible-light signal from the visible-light source in the predetermined direction toward the predetermined target in the parking space 910. Capturing a status reflection trace at the visible-light source 912, the status reflection trace being a trace, captured by the sensor at the visible-light source, of a reflection of the status visible-light signal emitted from the visible-light source. Determining a time-of-flight difference value by comparing the status reflection trace to the available space time-of-flight trace 914. Comparing the time-of-flight difference value with the availability threshold value 916 and determining a status of the parking space to be one of available and not available 918.

The available space time-of-flight trace can optionally include a trace of a reflection of an obstacle located between the visible-light source and the predetermined target and the determining a time-of-flight difference value includes considering the trace of the reflection of the obstacle 922.

The method preferably comprises indicating a status of the availability of the parking space using a status indicator for the parking space 920.

Optionally, invisible light source can be provided and used 902.

Figure 10:
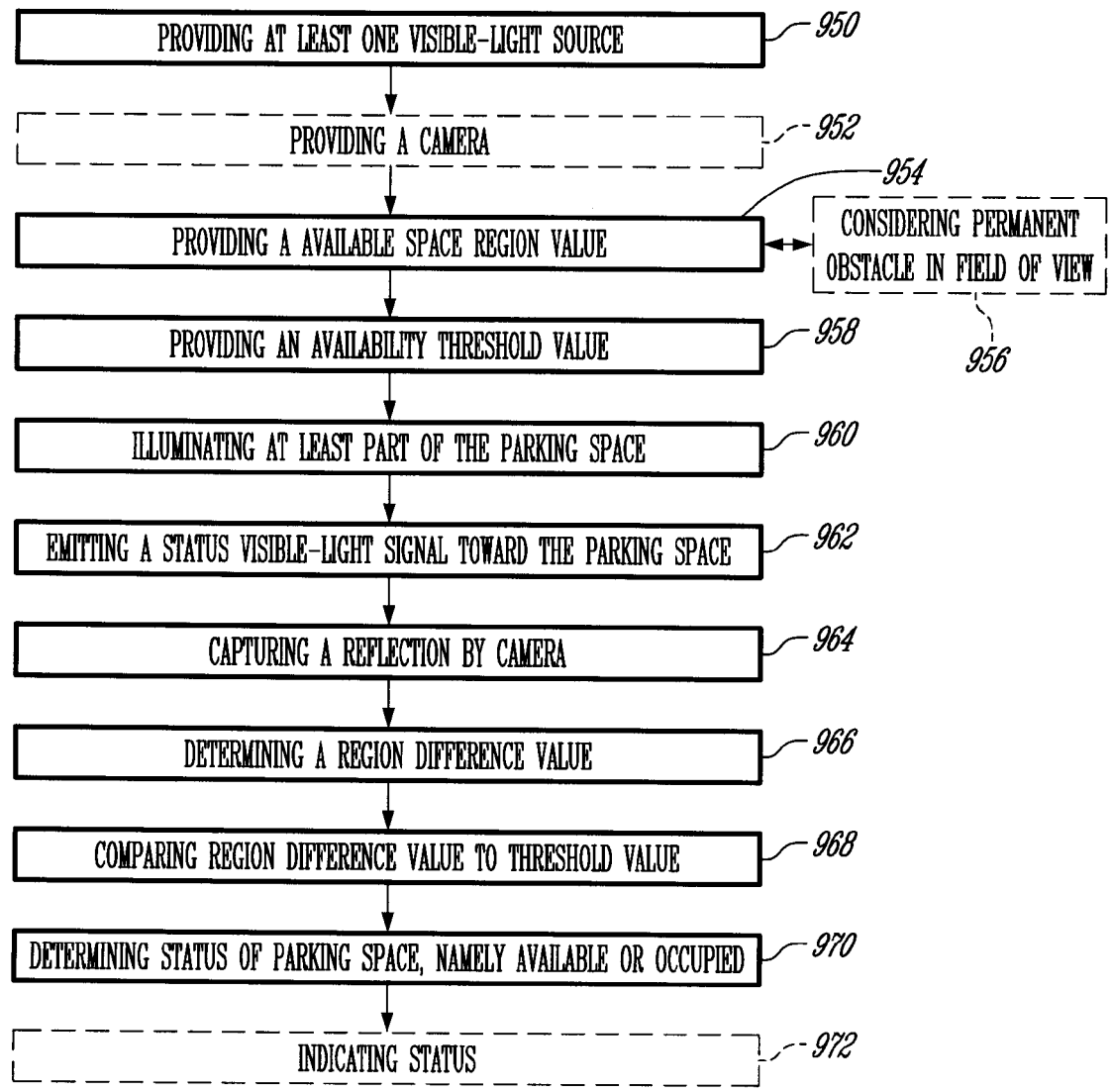
FIG. 10 is a flow chart of the main steps of another embodiment of the invention.

With reference to FIG. 10, another method for detecting availability of a parking space in a parking facility comprises the following steps. Providing a lighting system having at least one visible-light source for illumination of at least part of the parking space 950. Providing a camera 952. Providing an available space region value 954, the available space region value being a value of shape of a region detected by the camera when visible light emitted from the visible-light source has traveled from the visible-light source in a predetermined direction to a predetermined target in the parking space when the parking space is available, has been reflected by the target, has traveled back from the target to the camera and has been captured by the camera. Providing an availability threshold value 958, the availability threshold value being a difference value from the available space region value at which the parking space is determined to be available. Illuminating the at least part of the parking space using the at least one visible-light source 960. Emitting visible light from the visible-light source in the predetermined direction to the predetermined target in the parking space 962. Capturing a reflection of the emitted visible light at the camera and determining a status region value 964. Determining a region difference value by comparing the status region value to the available space region value 966. Comparing the region difference value with the availability threshold value 968 and determining a status of the parking space to be one of available and not available 970.

The available space region value can optionally take into consideration, a permanent obstacle in the field of view 956.

The method preferably comprises indicating a status of the availability of the parking space using a status indicator for the parking space 972.

Optionally, invisible light source can be provided and used 902. The available space time-of-flight trace can optionally include a trace of a reflection of an obstacle located between the visible-light source and the predetermined target and the determining a time-of-flight difference value includes considering the trace of the reflection of the obstacle 922.

The method preferably comprises indicating a status of the availability of the parking space using a status indicator for the parking space 920.

This invention provides a cost effective solution by integrating an energy efficient illumination with added-value parking guidance with real-time data of parking space vacancy. The strength of the invention resides in the important valuation of the sensing functions brought to the lighting system and by the advantage in terms of diminution of cost of installation since only one installation is required for the two functions (illumination and detection) covering the same area and sharing the same electrical infrastructure.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

What is claimed is:

1. A method for detecting availability of an individual parking space in a parking facility having a plurality of parking spaces, comprising:
   providing a lighting system having at least one visible-light Light-Emitting-Diode (LED) source for at least partial illumination of at least two of said parking spaces in an illumination zone;
   providing an available space time-of-flight trace for each of said at least two parking spaces in said illumination zone, said available space time-of-flight trace being a trace, captured by a sensor of said visible-light source, of a reflection of an available space visible-light signal emitted from said visible-light source in said illumination zone, when a corresponding parking space is available;
   providing an availability threshold value, said availability threshold value being a difference value from said available space time-of-flight trace at which said corresponding parking space is determined to be available;
   at least partly illuminating said at least two of said parking spaces in said illumination zone using said at least one visible-light source, said at least two of said parking spaces including said individual parking space, said at least partly illuminating having a purpose of assisting human vision in said illumination zone;
   emitting a status visible-light signal from said visible-light source in said illumination zone while maintaining said at least partly illuminating said at least two parking spaces;
   capturing a status reflection trace at said visible-light source, said status reflection trace being a trace, captured by said sensor at said visible-light source, of a reflection of said status visible-light signal emitted from said visible-light source;
   determining a time-of-flight difference value by comparing said status reflection trace to said available space time-of-flight trace for said individual parking space;
   comparing said time-of-flight difference value with said availability threshold value and determining a status of said individual parking space to be one of available and not available.

2. The method as claimed in claim 1, wherein said available space time-of-flight trace includes a trace of a reflection of an obstacle located in said illumination zone and said determining a time-of-flight difference value includes considering said trace of said reflection of said obstacle.

3. The method as claimed in claim 1,
   wherein said lighting system comprises a status indicator for said parking space; and
   wherein said method further comprises activating said status indicator to indicate said status of said parking space.

4. The method as claimed in claim 1, further comprising:
   activating at least one of said visible-light source to signal said status of said parking space.

5. The method as claimed in claim 1, further comprising:
   sensing environment conditions in said parking facility, said environment conditions being at least one of a temperature of at least a part of said parking facility, a natural light intensity in at least a part of said parking facility, a presence of a pedestrian in at least a part of said parking facility;
   determining a preferred lighting output of said lighting system using said sensed environment conditions;
   wherein said at least partly illuminating said at least two of said parking spaces in said illumination zone comprises controlling said lighting system to generate said preferred lighting output.

6. The method as claimed in claim 1, further comprising:
   triggering a timer when said status is determined;
   providing a status update delay;
   after said timer has reached said status update delay, repeating said steps of emitting, capturing, determining, comparing, triggering and repeating.

7. The method as claimed in claim 1, further comprising:
   providing a pedestrian time-of-flight trace for each of said at least two parking spaces in said illumination zone, said pedestrian time-of-flight trace being a trace, captured by said sensor of said visible-light source, of a reflection of a pedestrian visible-light signal emitted from said visible-light source, in said corresponding parking space, when a pedestrian is located in said corresponding parking space;
   providing a pedestrian threshold value, said pedestrian threshold value being a difference value from said pedestrian time-of-flight trace at which a pedestrian is determined to be present in said corresponding parking space;
   determining a pedestrian time-of-flight difference value by comparing said status reflection trace to said pedestrian time-of-flight trace for said individual parking space; and comparing said pedestrian time-of-flight difference value with said pedestrian threshold value and determining a status of said individual parking space to be one of having a pedestrian present in said individual parking space and not having a pedestrian present in said individual parking space.

8. The method as claimed in claim 1, wherein said illuminating and said emitting comprise modulating said at least one visible-light source at a frequency higher than 100 Hz.

9. The method as claimed in claim 1, wherein said lighting system further comprises an auxiliary light source, said auxiliary light source being one of a visible-light source and a non-visible light source.

10. A method for detecting availability of an individual parking space in a parking facility having a plurality of parking spaces, comprising:
providing a lighting system having at least one visible-light Light-Emitting-Diode (LED) source for at least partial illumination of at least two of said parking spaces in an illumination zone;
providing a camera;
providing an available space region value for each of said at least two parking spaces in said illumination zone, said available space region value being a value of shape of a region detected by said camera when visible light emitted from said visible-light source has traveled from said visible-light source in said parking illumination zone when a corresponding parking space is available, has been reflected, has traveled back to said camera and has been captured by said camera;
providing an availability threshold value, said availability threshold value being a difference value from said available space region value at which said corresponding parking space is determined to be available;
at least partly illuminating said at least two parking spaces in said illumination zone using said at least one visible-light source, said at least two of said parking spaces including said individual parking space, said at least partly illuminating having a purpose of assisting human vision in said illumination zone;
emitting visible light from said visible-light source in said illumination zone while maintaining said at least partly illuminating said at least two parking spaces;
capturing a reflection of said emitted visible light at said camera and determining a status region value;
determining a region difference value by comparing said status region value to said available space region value for said individual parking space; and
comparing said region difference value with said availability threshold value and determining a status of said individual parking space to be one of available and not available.

11. The method as claimed in claim 10, wherein said available space region value includes an obstacle value of a shape of an obstacle located in said illumination zone and said determining said region difference value includes considering said obstacle value.

12. The method as claimed in claim 10,
wherein said lighting system comprises a status indicator for said parking space; and
wherein said method further comprises activating said status indicator to indicate said status of said parking space.

13. The method as claimed in claim 10, further comprising: activating at least one of said visible-light source to signal said status of said parking space.

14. The method as claimed in claim 10, further comprising:
triggering a timer when said status is determined;
providing a status update delay;
after said timer has reached said status update delay, repeating said steps of emitting, capturing, comparing, comparing, triggering and repeating.

15. The method as claimed in claim 10, wherein said lighting system further comprises an auxiliary light source, said auxiliary light source being one of a visible-light source and a non-visible light source.

16. A system for detecting availability of an individual parking space in a parking facility having a plurality of parking spaces, comprising:
a powered lighting module having:
at least one visible-light Light-Emitting-Diode (LED) source driven by an illumination driver, for at least partly illuminating at least two of said parking spaces and emitting a status visible light signal from said visible-light source in a illumination zone, said at least two of said parking spaces including said individual parking space;
an optical detector for capturing a status reflection trace at said lighting module, said status reflection trace being a trace of a reflection of said status visible-light signal emitted from said visible-light source;
a lighting module processor for controlling said illumination driver and said optical detector and receiving said status reflection trace;
a powered central unit having:
a memory for
storing an available space time-of-flight trace for each of said at least two parking spaces in said illumination zone, said available space time-of-flight trace being a trace, captured by said optical detector, of a reflection of an available space visible-light signal emitted from said visible-light source, when a corresponding parking space is available; and
storing an availability threshold value, said availability threshold value being a difference value from said available space time-of-flight trace at which said corresponding parking space is determined to be available;
a central unit processor for
receiving said status reflection trace from said lighting module processor;
retrieving said available space time-of-flight trace and said availability threshold value from said memory,
determining a time-of-flight difference value by comparing said status reflection trace to said available space time-of-flight trace for said individual parking space; and
comparing said time-of-flight difference value with said availability threshold value and determining a status of said individual parking space to be one of available and not available;
a network for communicating information between said processor and said central unit.

17. The system as claimed in claim 16, wherein said optical detector includes a lens.

18. The system as claimed in claim 16, wherein said lighting module further comprises:
a status indicator for said parking space driven by an indicator controller controlled by said lighting module processor, said lighting module processor activating said status indicator to indicate said status of said parking space.

19. The system as claimed in claim 16, wherein said lighting module further comprises:
   a modulation driver for modulating said light source to emit a status visible light signal from said visible-light source in said illumination zone.

20. The system as claimed in claim 16, wherein said lighting module further comprises:
   an auxiliary light source, said auxiliary light source being one of a visible-light source and a non-visible light source;
   a modulation driver for modulating said auxiliary light source.

21. The system as claimed in claim 16, further comprising:
   sensors for sensing environment conditions in said parking facility, said sensors being at least one of a thermometer for sensing a temperature of at least a part of said parking facility, a light intensity detector for measuring a natural light intensity in at least a part of said parking facility, an infrared detector for detecting a presence of a pedestrian in at least a part of said parking facility;
   said lighting module processor controlling said illumination driver to generate a preferred lighting output using said sensed environment conditions.

22. The system as claimed in claim 16, wherein said modulation driver modulates said light source at a frequency higher than 100 Hz.

* * * * *

UNITED STATES PATENT AND TRADEMARK OFFICE
CERTIFICATE OF CORRECTION

PATENT NO. : 8,723,689 B2
APPLICATION NO. : 12/809228
DATED : May 13, 2014
INVENTOR(S) : Yvan Mimeault Page 1 of 1

It is certified that error appears in the above-identified patent and that said Letters Patent is hereby corrected as shown below:

In the Claims:

In claim 10, column 13, line 28, the word "parking" should be deleted.

In claim 16, column 14, line 20, the word "a" should be replaced with "an".

Signed and Sealed this
Twelfth Day of August, 2014

Michelle K. Lee
*Deputy Director of the United States Patent and Trademark Office*